(12) United States Patent
Saito et al.

(10) Patent No.: US 6,603,852 B2
(45) Date of Patent: Aug. 5, 2003

(54) OPERATOR CALL-FIELDING SCENARIO SYSTEM

(75) Inventors: Toshiyuki Saito, Kawasaki (JP); Takayasu Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,672

(22) Filed: Oct. 13, 1998

(65) Prior Publication Data

US 2002/0176564 A1 Nov. 28, 2002

(30) Foreign Application Priority Data

Feb. 19, 1998 (JP) .......................................... 10-036858

(51) Int. Cl.⁷ .............................................. H04M 3/00
(52) U.S. Cl. ........................... 379/265.01; 379/214.01; 379/265.02; 379/265.09; 379/258; 379/260; 379/267
(58) Field of Search ................................ 379/264, 265, 379/220, 201, 266, 67, 93.12, 208.01, 100.01, 100.11, 45, 214.01, 258, 260, 267

(56) References Cited

U.S. PATENT DOCUMENTS

| | | | | |
|---|---|---|---|---|
| 4,802,209 | A | * | 1/1989 | Hasegawa .............. 379/217.01 |
| 5,210,789 | A | * | 5/1993 | Jeffus et al. ........... 379/127.01 |
| 5,475,819 | A | * | 12/1995 | Miller et al. ................ 709/203 |
| 5,499,289 | A | * | 3/1996 | Bruno et al. ................ 379/220 |
| 5,515,421 | A | * | 5/1996 | Sikand et al. ................ 379/67 |
| 5,528,678 | A | * | 6/1996 | Kaplan ....................... 379/201 |
| 5,638,426 | A | * | 6/1997 | Lewis ..................... 379/90.01 |
| 5,884,262 | A | * | 3/1999 | Wise et al. ............ 704/270.01 |
| 5,903,641 | A | * | 5/1999 | Tonisson .................... 379/266 |
| 5,918,207 | A | * | 6/1999 | McGovern et al. ............ 705/1 |
| 5,964,700 | A | * | 10/1999 | Tallman et al. ............. 600/300 |
| 6,052,460 | A | * | 4/2000 | Fisher et al. ................. 379/266 |
| 6,082,776 | A | * | 7/2000 | Feinberg ....................... 283/72 |
| 6,122,364 | A | * | 9/2000 | Petrunka et al. ............ 379/265 |

FOREIGN PATENT DOCUMENTS

| | | |
|---|---|---|
| JP | 2-141056 | 5/1990 |
| JP | 5-292176 | 11/1993 |

* cited by examiner

*Primary Examiner*—Ahmad F. Matar
*Assistant Examiner*—Bing Bui
(74) *Attorney, Agent, or Firm*—Katten Muchin Zavis Rosenman (57) ABSTRACT

An operator call-fielding scenario system which displays a response scenario to an operator who is responding to an incoming call includes a memory unit which stores a plurality of scenario parts making up a plurality of response scenarios; a scenario setting unit which selects predetermined scenario parts from the plurality of scenarios parts in the memory unit, in accordance with one of a plurality of conditions, and sets a response scenario with the predetermined scenario parts according to the one condition; and a display unit which displays the set response scenario. Using this configuration, response scenarios matched in the optimum way with various circumstances can be set. The plurality of conditions include, for example, the type of person making the call, a history according to the person making the call, the circumstances of the wait of the person making the call, the circumstances of the response to the person making the call, the abilities of the operator, and background factors, or a combination thereof. Further, the type of person making the call includes, for example, the age group, sex or occupation of the person making the call, and the background factors include, for example, the weather, entertainment and incidents.

5 Claims, 8 Drawing Sheets

OPERATOR CALL-FIELDING SCENARIO SYSTEM

BACKGROUND OF THE INVENTION

1. Field of the Invention

The present invention relates to an operator call-fielding scenario system which makes a display on an operator terminal of a call center for carrying out telephone reception work, and which aids the fielding of calls by an operator.

2. Description of the Related Art

Recent years have seen an increase in the work of installing a call centers for carrying out telephone reception work, Given this background, operator terminals are provided with call-fielding scenarios in order to supplement skill deficiencies in operators who carry out telephone reception duties.

In the past, there has, by and large, been only one scenario displayed on the operator terminal of the call center for carrying out telephone reception work, and which aids the fielding of calls by the operator.

However, it is not necessarily the case that all of the clients who telephone will talk in line with the flow of the scenario. Thus, inter alia, if the telephone discourse with the client departs from a scenario, there is the problem that the operator cannot rapidly respond with content which differs from that scenario and there is a reduction in the level of satisfaction of the client in the telephone discourse, and there is the problem that the working environment of the operator deteriorates in that the operator experiences mental distress.

SUMMARY OF THE INVENTION

Thus, taking the above problems into account, the present invention aims to provide an operator call-fielding scenario system which is able to display the optimum scenario for the circumstances on an operator terminal.

The operator call-fielding scenario system of the present invention for achieving the above mentioned aim is an operator call-fielding scenario system which displays a response scenario to an operator who is responding to an incoming call, comprising: a memory unit which stores a plurality of scenario parts making up a plurality of response scenarios; a scenario setting unit which selects predetermined scenario parts from the plurality of scenarios parts in the memory unit, in accordance with one of a plurality of conditions, and sets a response scenario with the predetermined scenario parts according to the one condition; and a display unit which displays the set response scenario.

Using this configuration, response scenarios matched in the optimum way with various circumstances can be set.

In addition, preferably, the plurality of conditions have priorities, and the scenario-setting unit selects the condition, among the plurality of conditions, which has the highest the priority.

Further, if another scenario part which differs from the predetermined scenario parts contained in the response scenario is used at the time of a response by the operator, the scenario setting unit adds or substitutes the other scenario part into the response scenario, in accordance with the frequency of use of the other scenario part.

It should be noted that the plurality of conditions include, for example, the type of person making the call, a history according to the person making the call, the circumstances of the wait of the person making the call, the circumstances of the response to the person making the call, the abilities of the operator, and background factors, or a combination thereof. Further, the type of person making the call includes, for example, the age group, sex or occupation of the person making the call, and the background factors include, for example, the weather, entertainment and incidents.

Other features and advantages of the present invention will become readily apparent from the following description when taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DESCRIPTION OF THE PREFERRED EMBODIMENT

A mode of embodiment of the present invention is described below. However, the technical scope of the present invention is not limited to this mode of embodiment. It should be noted that, in the drawings, the same reference numbers or reference codes have been ascribed to identical or analogous elements.

Figure 1:
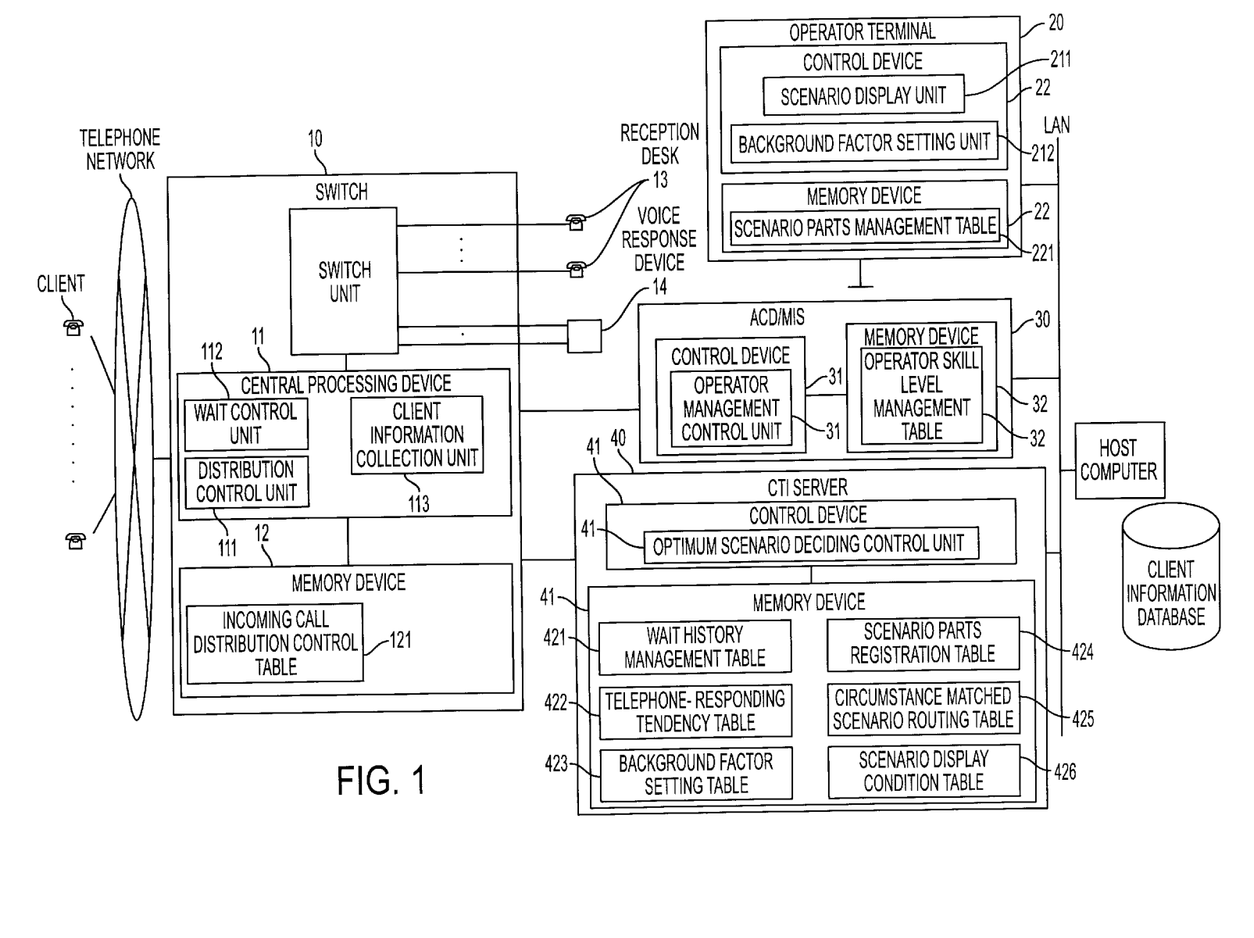
FIG. 1 is a block drawing of an operator call-fielding scenario system in a mode of embodiment of the present invention.
Figure 2:
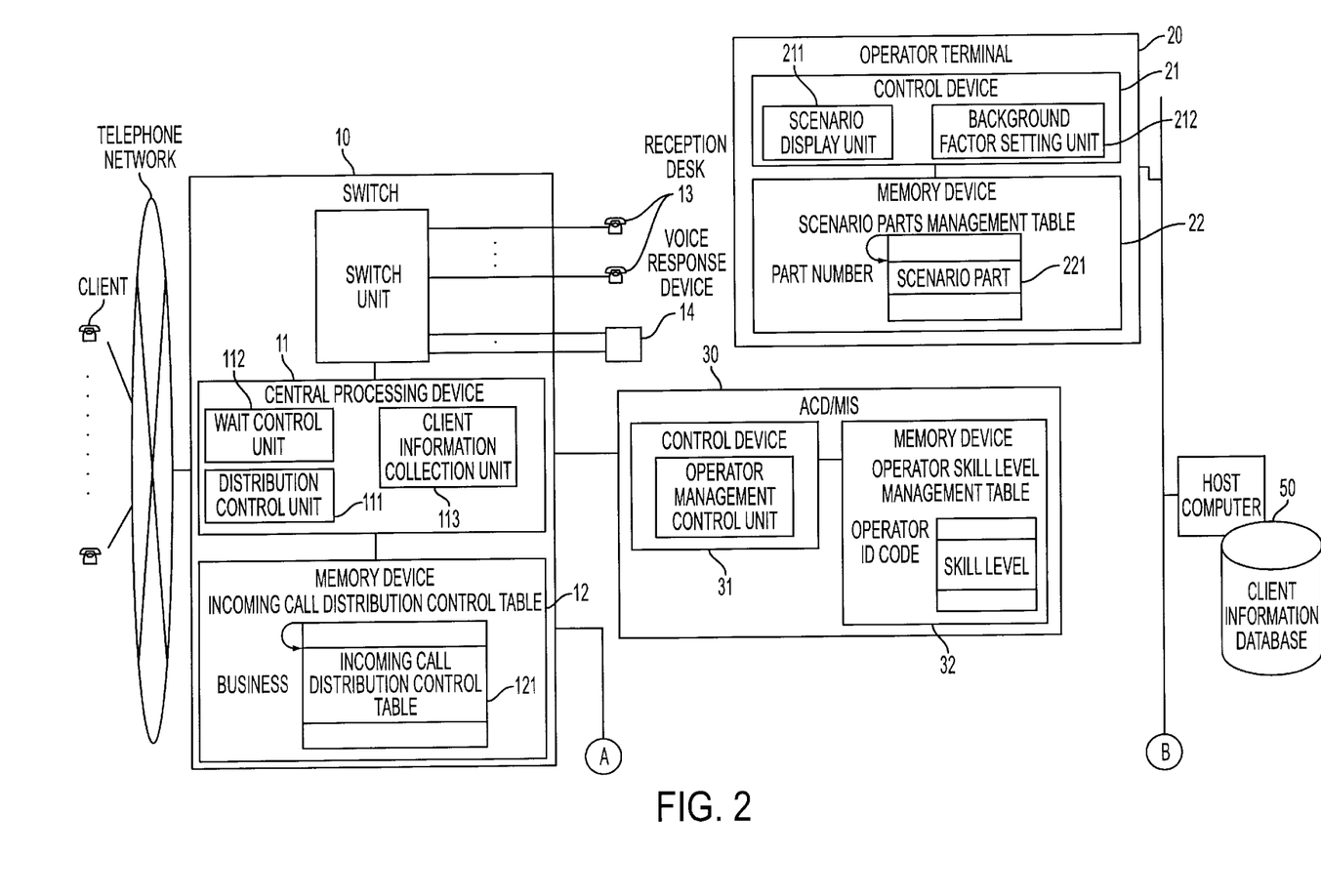
FIG. 2 is a more detailed drawing of FIG. 1 (a first such drawing).
Figure 3:
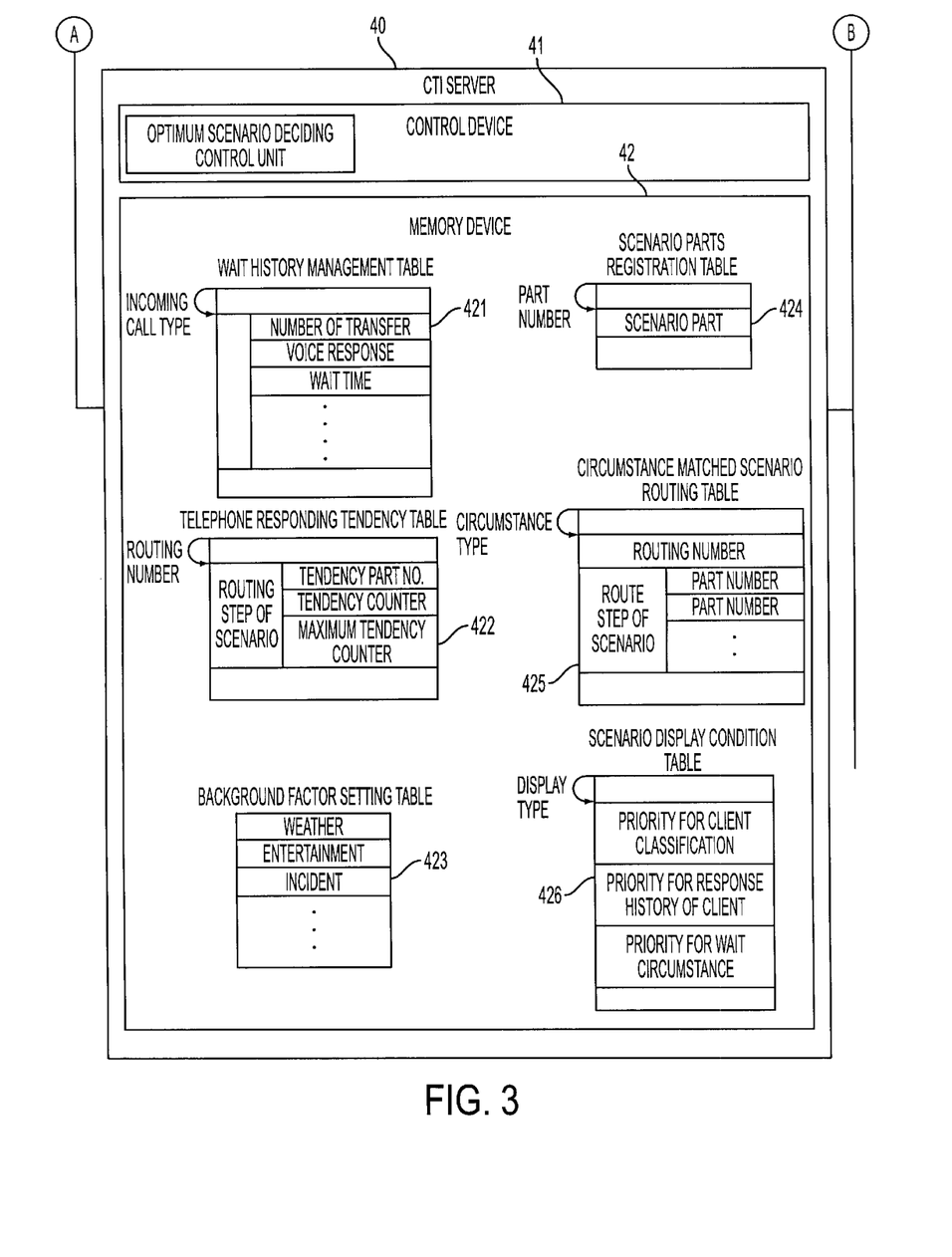
FIG. 3 is a more detailed drawing of FIG. 1 (a second such drawing).

FIG. 1 is a block diagram of an operator call-fielding scenario system (referred to as a scenario system hereinbelow) in a mode of embodiment of the present invention. FIG. 2 and FIG. 3 are more detailed diagrams of FIG. 1.

The scenario system in FIG. 1 through FIG. 3 comprises an switch 10 which distributes incoming calls to various reception desks, an operator terminal 20 provided in a reception desk, an ACD/MIS (Automatic Call Distribution/Management Information System) 30 for managing the operator, a CTI (Computer Telephony Integration) server 40 for controlling the scenario of the operator, and a client information database 50 held in a host computer.

In FIG. 1 or FIG. 2, the switch 10 is equipped with a central processing device 11 and a memory device 12. Further, the central processing device 11 has an incoming call distribution control unit 111 which controls the distribution, to various reception desks 13 or a voice response device 14, of telephone calls from clients (people calling in) which have come in to the switch 10 via a telephone network; a wait' control unit 112 which carries out waiting control when all of the reception desks 13 are engaged and immediate incoming call processing is not possible; and a client information collection unit 113 which collects client information such as the telephone number of the incoming caller. Also, as discussed hereinbelow, the memory device 12 is equipped with an incoming call distribution control table 121 determining the distribution destination according to the client who is making the incoming telephone call.

The operator terminal 20 is equipped with a control device 21 and a memory device 22. Further, as discussed hereinbelow, the control device 21 has a scenario display unit 211 and a background factor setting unit 212, while the memory device 22 has a scenario parts management table 221.

The ACD/MIS 30 is equipped with a control device 31 and a memory device 32. Further, as discussed hereinbelow, the control device 31 has an operator management control unit 311, while the memory device 32 has an operator skill level management table 321.

Further, the CTI server 40 in FIG. 1 or FIG. 3 is equipped with a control device 41 and a memory device 42. Further, as discussed hereinbelow, the control device 41 has an optimum scenario deciding control unit 411, while the memory device 42 has a wait history management table 421, a telephone-responding tendency table 422, and background factor setting table 423, a scenario parts registration table 424, a circumstance-matched scenario routing table 425, and a scenario display condition table 426.

With a scenario system having such a configuration, in a mode of embodiment of the present invention, a plurality of scenarios for the operator to respond to clients are set in the CTI server 40 as aggregation of components (referred to as scenario parts hereinbelow) which are elements of the plurality of scenarios. Further, the CTI server 40 selects scenario parts and builds up a scenario from the plurality of scenario parts, in accordance with various conditions during the response by the operator. Further, the scenario which is built up is displayed on the display screen (not depicted) of the operator terminal 20, and the operator responds to the client following this scenario.

The mode of embodiment of the present invention is described in further detail with reference to FIG. 3. In FIG. 3, in the CTI server 40, the plurality of scenario parts are set by ascribing predetermined part numbers to the scenario parts registration table 424 of the memory device 42. A plurality of scenario parts are set in such a way as to match various conditions.

For example, for an operator in telesales who gives, say, descriptions of products, the content of the response to the client making the telephone call will differ depending upon considerations such as the age, sex and occupation of the client. Such client classification data is held in memory in the client information database 50.

In addition, when a client makes a telephone call, the attitude of the client differs depending upon considerations such as the time taken before connecting with the operator and the number of times they are transferred. For example, if the time taken before connecting with the operator was long, or if the client was transferred many times, one can anticipate that, when connected to the operator, the client will feel displeased. The circumstances when the client is kept waiting at such times are stored in the wait history management table 421 as call history information such as the number of transfers, whether a voice response was involved, and wait time, for each incoming call.

Further, for example, for an operator in a travel company who gives travel advice, the content of the response to the client will differ depending on background factors such as whether there is an entertainment(or an amusement), an incident(or an event) or the weather. The presence or absence of such background factors is set in the background factor setting table 423.

Scenario parts matching various circumstances as discussed above are registered in the scenario parts registration table 424. Further, registered in the circumstance-matched scenario routing table 425, are routing numbers for managing a plurality of scenarios set for various types of circumstances, and part numbers of scenario parts constituting response scenarios according to routing numbers, and the sequence (route steps) thereof.

For example, when the circumstance type involves client classification, a plurality of scenarios are set for each circumstance type, such as scenario for "man in his forties" and scenario for "woman in her twenties", and each is given a routing number.

It should be noted that, in order to identify the client from telephone calls from an indeterminate number of incoming callers, the telephone number of the incoming caller has to be acquired. The telephone number of the incoming caller is acquired, by way of example, by what is termed a 'number display service' in Japan, which is a service to display a telephone number of a incoming call on a telephone display, or the like whereby it is supplied by the company managing the telephone network. Further, client classification can be carried out from the telephone numbers held by the client information database 50 and data according to the owner of the telephone number, assuming that the owner is the caller.

Further, registered in the scenario display condition table 426 are the priorities when selecting a scenario displayed on the display screen of the operator terminal 20 from the plurality of scenarios registered in the circumstance-matched scenario routing table 425. For example, priorities for circumstance types such as client classification, response history of the client and wait circumstances are registered, according to the routing number, in the scenario display condition table 426.

In addition, there are occasions when a response which has not been built into a scenario is undertaken with the client, and there is a specific tendency in the content of the response with the client, when the operator is giving a response in accordance with the optimum scenario selected from the plurality of scenarios set in accordance with various circumstances as described above. The telephone-responding tendency table 422 is a table which manages the tendency to give responses whose content differs from the scenario initially set in this way, and is explained in detail in the description of FIG. 7 discussed hereinbelow.

Figure 4:
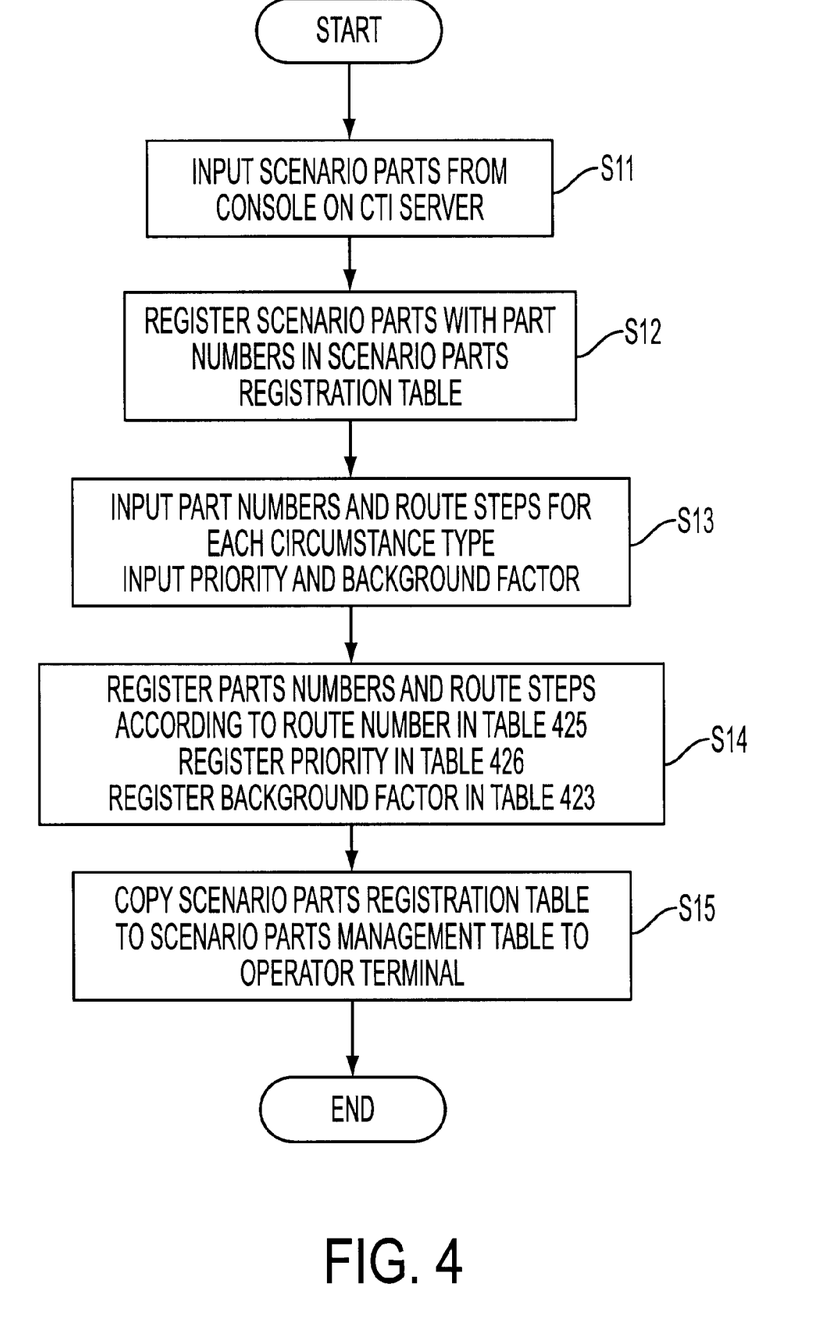
FIG. 4 is a flow chart for scenario parts registration control.

FIG. 4 is a flow chart for performing scenario parts registration control. In Step S11, a person making the input compiles scenario parts from the console on the CTI server 40. In Step S12, the scenario parts which have been input are registered together with predetermined part numbers in the scenario parts registration table 424. Further, in Step S13, the person making the input selects the scenario parts which a routing number has been given, and inputs the part numbers and the sequence (route steps) thereof, for each predetermined condition, which is to say circumstance type.

Further, the background factors and priority discussed above are input from the console of the CTI server 40 by the person making the input.

Further, in Step S14, the part numbers and route steps, and the priorities and background factors, which former are input according to routing numbers, are respectively registered in the circumstance-matched scenario routing table 425, scenario display condition table 426 and background factor setting table 423.

Further, in Step S15, at the time when the operator terminal is started up, the scenario parts registered in the scenario parts registration table 424 are all copied into the scenario parts management table 221 of the memory device 22 of the operator terminal 20. The reason why all of the scenario parts are copied into the scenario parts management table 221 is to allow the operator to search the response contents when a dialogue between the operator and client strays from the scenario displayed on the scenario display unit 221 of the operator terminal 20.

Figure 5:
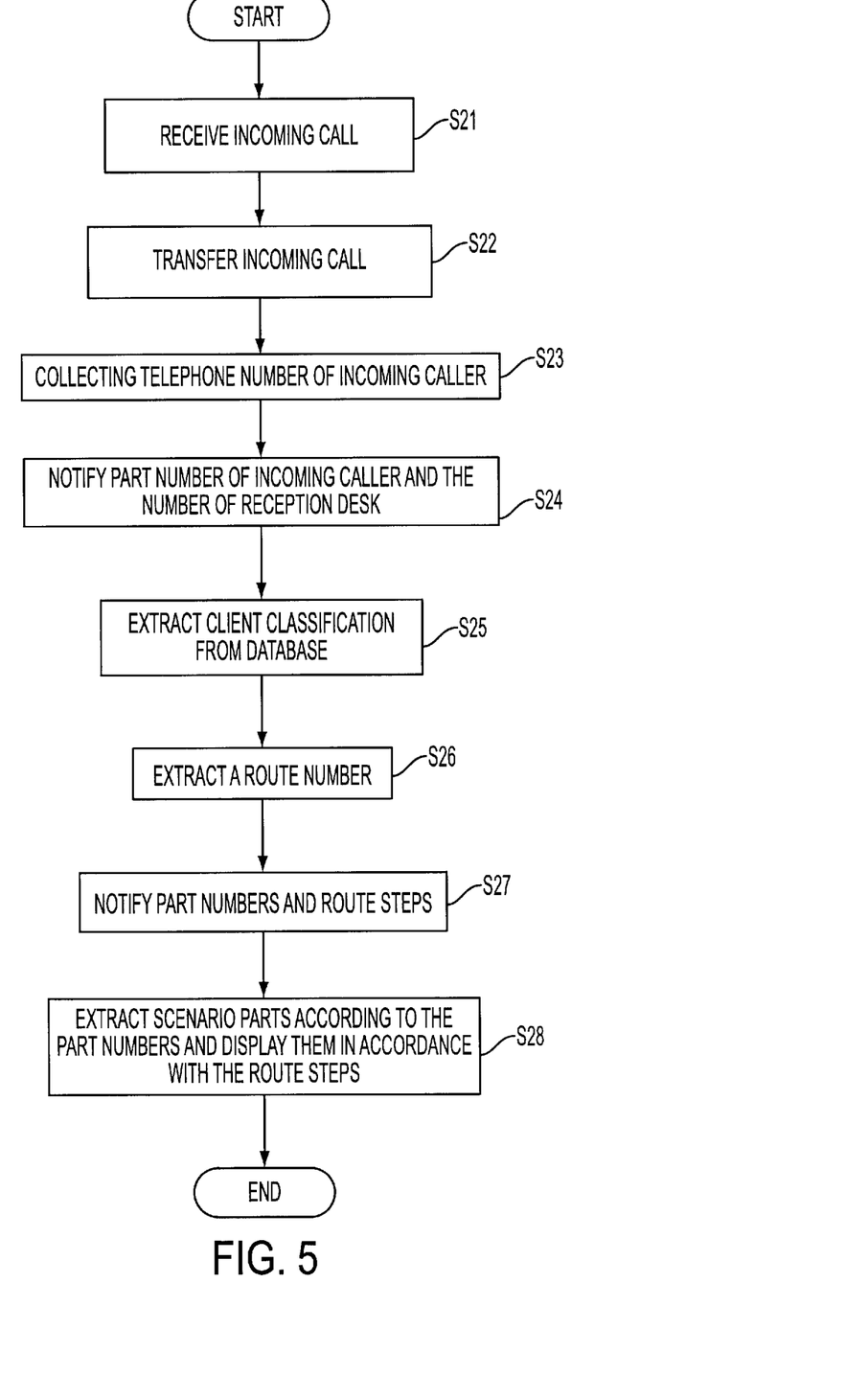
FIG. 5 is a flow chart for display of the optimum scenario on the operator terminal 20 using client classification.

FIG. 5 is a flow chart for displaying the optimum scenario on the operator terminal 20 using client classifications. In Step S21, a call from an incoming caller (client) is received by the call center. At this time, the incoming call distribution control unit 111 in the central processing device 11 of the exchange 10 identifies the telephone number of the call center which the incoming caller has dialed.

More specifically, there are occasions when a call center has a plurality of telephone numbers, and business is split between each of the telephone numbers. For example, in a call center for telesales, there are occasions when it will be split between an applications telephone number, an inquiries telephone number or complaints telephone number or the like. On such occasions, the incoming call distribution control unit 111 searches for the reception desk group responsible for the business according to the telephone number, from the incoming call distribution control table 121 (see FIG. 2) of the memory device 12, and transfers the incoming call to a vacant reception desk 13 (Step S22).

There are occasions when, for example, even when the call center has only one telephone number, business is divided between push numbers of the telephone pressed by the incoming caller, in accordance with guidance from the voice response device 14. On such occasions, the incoming call distribution control unit 111 searches for the reception desk group responsible for the business according to the push number, from the incoming call distribution control table 121 of the memory device 12, and transfers the incoming call to a vacant reception desk (Step S22).

Meanwhile, in Step S23, the client information collection unit 113 collects the telephone number of the incoming caller. Further, in Step S24, the client information collection unit 113 and the incoming call distribution control unit 111 notify the CTI server 40 of the telephone number of the incoming caller and the number of the reception desk which is the transfer destination respectively.

Further, in Step S25, the optimum scenario deciding control unit 411 of the control device 41 of the CTI server 40 extracts a client classification according to the telephone number of the incoming caller by accessing the client information database 50. The client information database 50 holds information relating to various client classifications such as the age, sex, occupation and interests of the client according to the telephone number.

Further, in Step S26, the optimum scenario deciding control unit 411 extracts a routing number, according to the extracted client classification, from the circumstance-matched scenario routing table 425, and, in Step S27, notifies the operator terminal 20 matching the reception desk to which the incoming call has been transferred of the part numbers managed by the routing number, and the route steps.

Further, in Step S28, the scenario display unit 211 of the control device 21 of the operator terminal 20 extracts the scenario parts, according to the part numbers which have been notified, from the scenario parts management table 221, and displays these on the display screen of the operator terminal 20 in accordance with the route steps.

Figure 6:
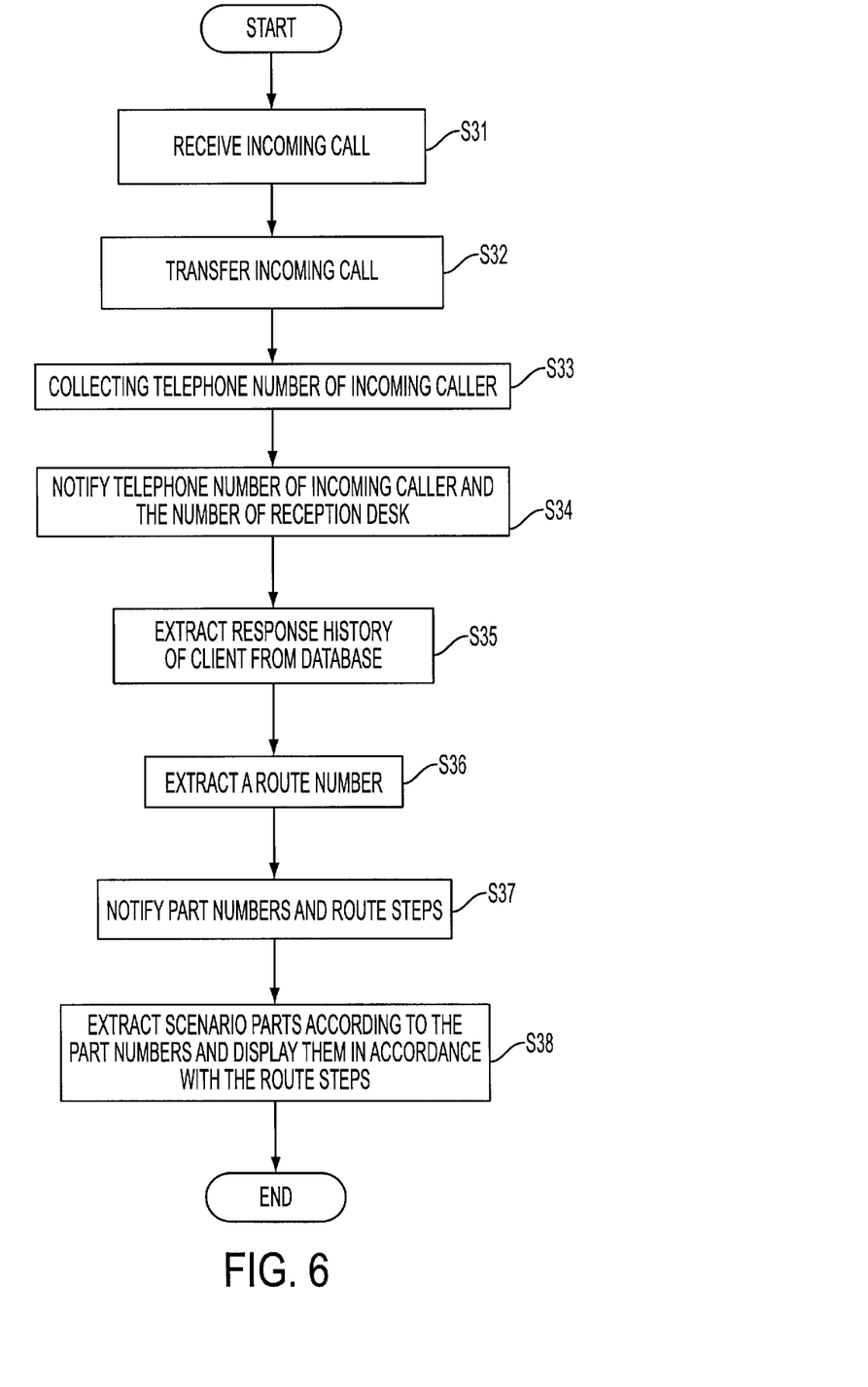
FIG. 6 is a flow chart for display of the optimum scenario on the operator terminal 20 using the response history of the client.

FIG. 6 is a flow chart for displaying the optimum scenario on the operator terminal 20 using the response history of the client. Step S31 through Step S34 are respectively the same as Step S21 through Step S24 in FIG. 5 discussed above.

Further, in Step S35, the optimum scenario deciding control unit 411 of the control device 41 of the CTI server 40 extracts response history information of the client according to the telephone number of the incoming caller. In addition to client information for the client classification discussed above, the client information database holds response history information about the circumstances of past transactions with the client, the circumstances of responses or the like.

For example, the response history information for travel advice in a travel company includes details of journeys which the client has inquired about or applied for in the past or the like.

Further, in Step S36, the optimum scenario deciding control unit 411 extracts a routing number according to the client's response history which has been extracted, from the circumstance-matched scenario routing table 425, and, in Step S37, notifies an operator terminal 20 according to the reception desk to which the incoming call was transferred of the part numbers managed by the routing number, and the route steps.

Further, in Step S38, the scenario display unit 211 of the control device 21 of the operator terminal 20 extracts scenario parts according to the parts number which have been notified, from the scenario parts management table 221, and displays these on the display screen of the operator terminal 20 in accordance with the route steps.

Figure 7:
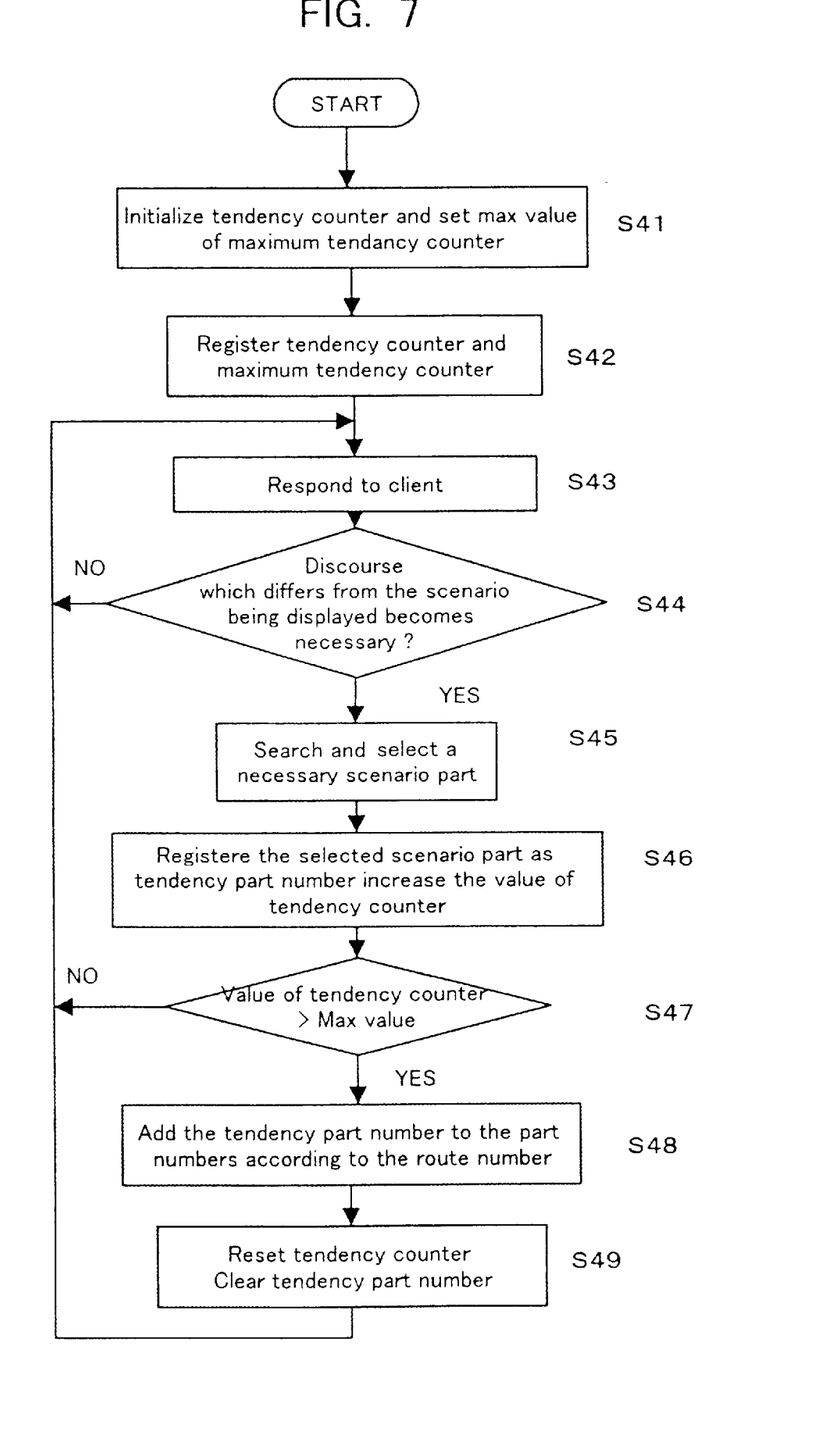
FIG. 7 is a flow chart for controlling rearrangement of the optimum scenario using the content of the responding tendency of the client.

FIG. 7 is a flow chart for controlling optimum scenario rearrangement using the content of the response tendencies of the client. In Step S41, the person making the input first respectively sets the initial value (zero) in the tendency counter of the telephone-responding tendency table 422 of the memory device 42, and the maximum value (max value) in the maximum tendency counter, from the console of the CTI server 40. The maximum value may be a frequency count or a ratio.

Further, in Step S42, the initial value of the tendency counter and the maximum value of the maximum tendency counter are registered in a matching area of the telephone-responding tendency table 422.

In this state, in Step S43, the operator responds to the client in accordance with the scenario displayed on the display screen of the operator terminal. Further, in Step S44, if a discourse which differs from the scenario being displayed becomes necessary during a discourse, then, in Step S45, the operator searches for and selects the scenario part(s) needed for this different discourse, from the scenario parts management table 221.

When the scenario part(s) has (have) been selected, then, in Step S46, the part number(s) of the selected scenario part(s) is (are) registered as tendency part number(s) in the telephone-responding tendency table, and the count of the tendency counter is increased.

Next, in Step S47, the value of the tendency counter whose count has been increased is compared with the maximum value set in the maximum tendency counter. Further, if the value of the tendency counter exceeds the maximum value, the system returns to Step S43. Meanwhile, if it does not exceeded it, then, in Step S48, the optimum scenario deciding control unit 411 adds the tendency part number(s) to the part numbers according to the routing number of the scenario being displayed, and adjusts the route steps. Alternatively, the tendency part number(s) may be substituted for an original part number (or numbers) in a predetermined route step (or steps).

Further, in Step S49, the tendency counter of the telephone-responding tendency table 422 is reset to the initial value, and the tendency part number(s) is (are) cleared.

Figure 8:
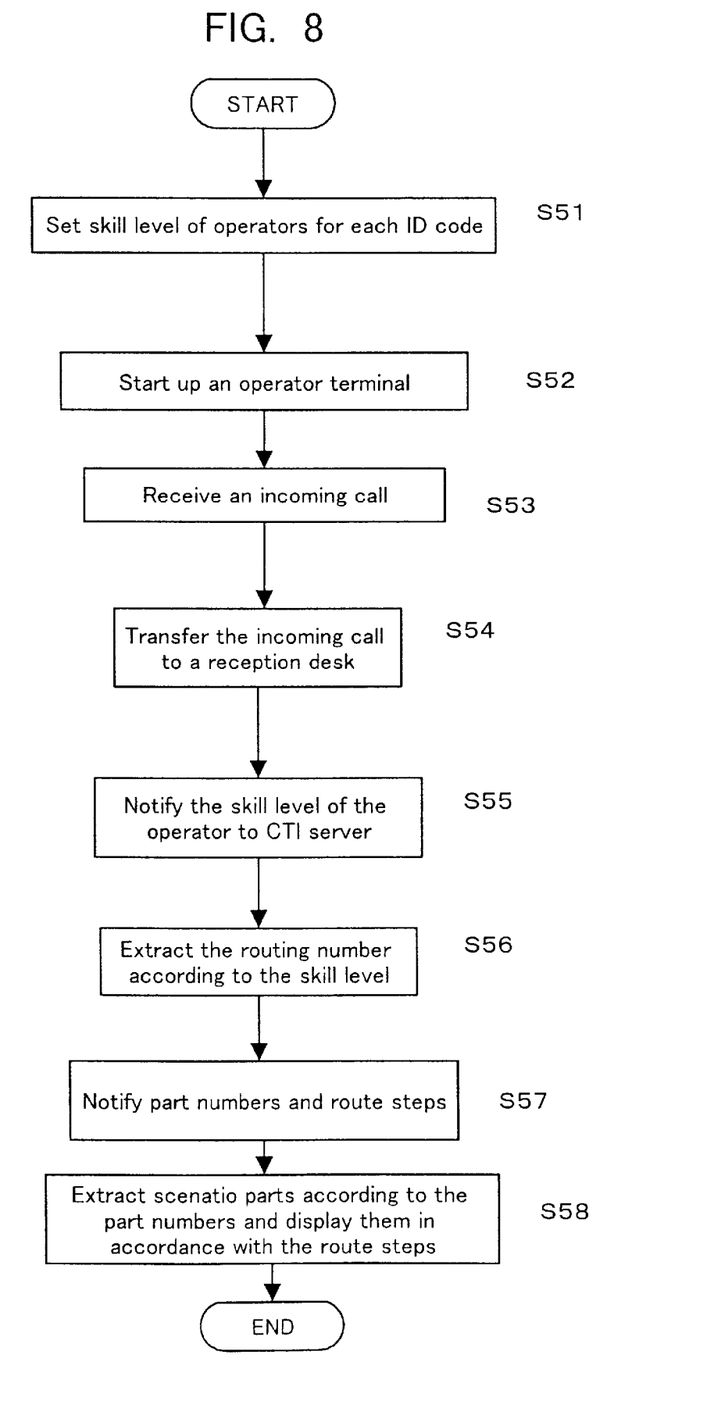
FIG. 8 is a flow chart for display control of the optimum scenario using the abilities of the operator.

FIG. 8 is a flow chart for display control of the optimum scenario using the abilities of the operator. In Step S51, the person making the input first sets the skill levels of the operators, for each ID code of the operators, using the console of the ACD/MIS 30. The skill levels of the operators are held in memory in an operator skill level management table 321 in the memory device 32 of the ACD/MIS 30. In Step S52, the operator starts up the operator terminal 20 by inputting their own ID code in the reception desk upon starting work.

Meanwhile, when the call center receives an incoming call from a client (Step S53), then, in Step S54, the incoming call is transferred to a reception desk, within the reception group, which is vacant of incoming calls, in accordance with the incoming call distribution control table 121.

At this time, the number of the reception desk 13 to which the incoming call is transferred is notified to the operator management control unit 311 of the ACD/MIS 30 and the CTI server 40 from the incoming call distribution control unit 111. Further, the skill level of the operator in charge of this reception desk 13 is notified (Step S55) to the CTI server 40 from the operator management control unit 311. Thereupon, in Step S56, the CTI server 40 extracts the routing number of the scenario according to the skill level of the operator as notified, from the circumstance-matched scenario routing table 425, and, in Step S57, the route steps and the part numbers managed by this routing number are notified to the operator terminal 20.

In Step S58, the scenario display unit 211 of the operator terminal 20 extracts scenario parts according to the part numbers notified from the scenario parts management table 221 of the memory device 22, and displays them on the display screen of the operator terminal 20 in route step sequence.

It will be noted that, when selecting the routing number of the optimum scenario by the type of circumstance, the optimum scenario deciding control unit 411 of the CTI server 40 refers to the priority by type of circumstance which is set in the scenario display condition table 426, and selects the routing number of the optimum scenario for the type of circumstance with the high (preferably highest) priority.

In addition, the optimum scenario deciding control unit 411 is not limited to the selection of a scenario according to one type of circumstance, and is also able to set a scenario in which a plurality of types of circumstance have been combined. More specifically, a plurality of routing numbers are selected for each of a plurality of types of circumstance which have been set, and an optimum scenario is set by combining the part numbers contained therein by means of appropriate route steps.

As described above, the optimum scenario for the circumstances is displayed on an operator terminal when the operator call-fielding scenario system of the present invention is employed. Thus it can contribute to improved levels of client satisfaction in telephone responses in business and elsewhere, and an improved working environment for the operator.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. An operator call-fielding scenario system which displays a response scenario to an operator who is responding to an incoming call from a client caller, comprising:

a memory unit which stores a plurality of scenario parts making up a plurality of response scenarios;

a client information database storing client conditions;

a scenario setting unit which selects predetermined scenario parts from the plurality of scenario parts in the memory unit, in accordance with a client condition associated with one of a plurality of condition types, and sets up a response scenario for the incoming call automatically by combining the selected scenario parts; and a display unit which displays the response scenario set up;

wherein a priority is determined for each of at least two of the plurality of condition types, and the one of the plurality of condition types is selected as having a highest priority among the plurality of condition types.

2. The operator call-fielding scenario system according to claim 1, wherein the scenario setting unit adds or substitutes another scenario part into the response scenario in accordance with the frequency of use of the another scenario part which differs from the predetermined scenario parts contained in the response scenario.

3. The operator call-fielding scenario system according to claim 1, wherein the plurality of condition types include the type of person making the call, a history according to the person making the call, the circumstances of the wait of the person making the call, the circumstances of the response to the person making the call, the abilities of the operator, and background factors, or a combination thereof.

4. The operator call-fielding scenario system according to claim 3, wherein the type of person making the call includes the age group, sex or occupation of the person making the call.

5. The operator call-fielding scenario system according to claim 3, wherein the background factors include the weather, entertainment and incidents.

* * * * *